United States Patent [19]

Oogi et al.

[11] Patent Number: 4,896,238
[45] Date of Patent: Jan. 23, 1990

[54] TAPE CASSETTE WITH PRESSABLE CAP FOR FIXING REEL ON REEL BASE

[75] Inventors: Takashi Oogi; Tadao Igarashi, both of Miyagi; Haruyuki Karibe, Kanagawa, all of Japan

[73] Assignee: Sony Corporation, Tokyo, Japan

[21] Appl. No.: 127,387

[22] Filed: Dec. 2, 1987

[30] Foreign Application Priority Data

Dec. 5, 1986 [JP] Japan .......................... 61-187519[U]

[51] Int. Cl.⁴ ............................................ G11B 23/08
[52] U.S. Cl. .................................... 360/132; 242/199
[58] Field of Search ................. 360/132; 242/197–200

[56] References Cited

U.S. PATENT DOCUMENTS

| 3,706,426 | 12/1972 | Prahl | 242/198 |
| 3,869,099 | 3/1975 | Inaga | 242/199 |
| 4,561,609 | 12/1985 | Collins et al. | 242/199 |
| 4,715,558 | 12/1987 | Fair et al. | 242/199 |
| 4,757,399 | 7/1988 | Peterson et al. | 360/132 X |

FOREIGN PATENT DOCUMENTS

| 1099755 | 2/1961 | Fed. Rep. of Germany | 242/198 |
| 0125583 | 9/1980 | Japan | 360/132 |
| 0016180 | 1/1984 | Japan | 360/132 |

Primary Examiner—Stuart N. Hecker
Assistant Examiner—David J. Severin
Attorney, Agent, or Firm—Lewis H. Eslinger; Jay H. Maioli; Donald S. Dowden

[57] ABSTRACT

A reel presser for pressing a reel within a cassette casing which has an upper half and a lower half comprises a holder which abuts the reel and a cap engaged with the holder. The holder and the cap are arranged on opposite sides of the upper half, and a spring is provided between the upper half and the holder. When a tape cassette containing the reel presser is loaded in a cassette mounting device, a reel pressing member provided in the cassette mounting device depresses a continuous surface disposed at the top of the cap so as to depress the reel toward the lower half of the cassette casing.

7 Claims, 5 Drawing Sheets

TAPE CASSETTE WITH PRESSABLE CAP FOR FIXING REEL ON REEL BASE

BACKGROUND OF THE INVENTION

1. Field of the Invention

This invention relates generally to a tape cassette, and more particularly to a tape cassette having a casing which comprises an upper half, a lower half and within which casing a reel is urged toward the lower half. The invention is best suited for applying to a tape cassette for video tape recorders.

2. Description of the Prior Art

Firstly, a conventional tape cassette for video tape recorders (hereinafter described as VTR) will be described with reference to FIG. 1.

In the above tape cassette, a pair of right and left reels 2, on which a magnetic tape 1 is wound and only one of which is shown in FIG. 1, are rotatably accommodated in a cassette casing 5 which comprises an upper half 3 and a lower half 4. Reel pressing means 6 is fitted to a through hole 7 disposed in the upper half 3 so as to be movable in up and down direction, and is urged downwards by the force of a spring 8 which lies between the reel pressing means 6 and the upper half 3. Thus, a semi-sphere-like projection 9 provided at the central lower end of the reel pressing means 6, depresses a metal plate 11 as a bearing which is horizontally fixed to the upper end of a hub 10 of the reel 2 so that the reel 2 is urged toward the lower half 4.

When the tape cassette inserted into a cassette mounting device (not shown), which is provided in the VTR, is conveyed to a position where the tape cassette is mounted, a reel base 13 is relatively inserted from below in an opening 12 which is provided in the lower half 4, and a driving shaft 15 projecting from the central part of the reel base 13 is fitted into a hole 14 which is opened at the central lower end of the hub 10. At the same time, annular ribs 17 projecting from the bottom face of the lower flange 16 of the reel 2 in coaxial relation with the reel 2 abut against the reel base 13, so that the lower flange 16 of the reel 2 is separated upwards from the lower half 4, and at that time, a reel pressing member 18 comprising a leaf spring or the like, and provided in the cassette mounting device, depresses the top end 6a of the reel pressing means 6, so that the reel 2 is firmly fixed to the reel base 13 by the forces of the reel pressing member 18 and spring 8.

Meanwhile, it will be seen that the reel pressing means 6 of the tape cassette has a plurality of vertical slits 19 at the upper end 6a thereof so as to make a plurality of engaging portions 20 capable of elastic deformation. Thus, if the engaging portions 20 of the reel pressing means 6 are inserted from below into the through hole 7 of the upper half 3, the reel pressing means 6 can be connected to the upper half 3.

As a result, the top face 6a of the reel pressing means 6 is of discontinuous surface, so that the reel pressing member 18 of the cassette mounting device is apt to be caught by the reel pressing means 6 when it abuts against the top face 6a of the reel pressing means 6, and thereby, the action of the reel pressing member 18 is made uncertain.

The uncertain action of the reel pressing member 18 makes it difficult to stably fix the reel 2 to the reel base 13, thus the magnetic tape 1 can not run stably due to unsmooth rotation of the reel 2, such as a gyration of the rotation axis of the reel 2 or an irregular movement of the reel 2. Moreover, there are many restrictions to determine the configuration and construction of the reel pressing member 18 so as not to have the reel pressing member 18 caught by the reel pressing means 6.

Instead, if the reel pressing means 6 is constructed so as to be inserted from above into the through hole 7 of the upper half 3, the reel pressing means 6 must come out of the through hole 7 when the reel 2 is pressed upwards by a large force, or the discontinuous surface of the reel pressing means which comes in contact with the bearing 11 of the reel 2, must wear quickly when the reel is rotated.

OBJECTS AND SUMMARY OF THE INVENTION

Accordingly, it is an object of the present invention to provide a tape cassette, in which a reel pressing member provided in a cassette mounting device is made to firmly come in contact with a reel pressing means provided in the tape cassette, so that the reel pressing means is always stably pressed by the reel pressing member.

Another object of the invention is to provided a tape cassette, in which reel pressing means provided in the tape cassette scarcely imposes any restriction on the configuration and construction of a reel pressing member provided in a cassette mounting device.

In accordance with one aspect of this invention, reel pressing means for depressing a reel accommodated in a tape cassette, comprises a cap, a holder and a spring, and the cap has a continuous surface. As a reel pressing member provided in a reel mounting device abuts against the continuous surface of the cap, the reel pressing member can stably depress the reel pressing means of the tape cassette.

DETAILED DESCRIPTION OF THE PREFERRED EMBODIMENT

An embodiment of the present invention which is applied to a tape cassette for a video recorder will be described with reference to FIGS. 2 to 6.

Figure 1:
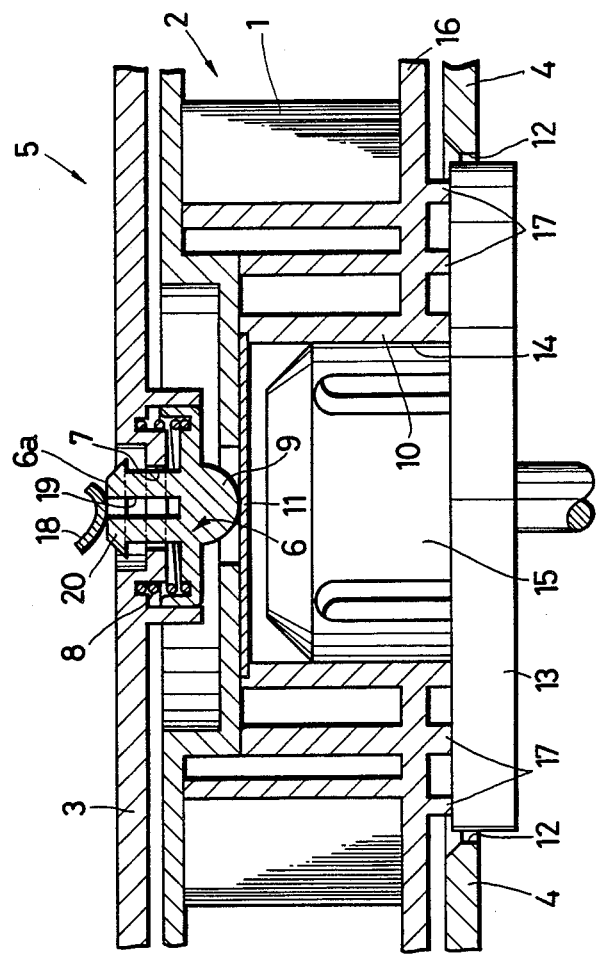
FIG. 1 is sectional view of the essential part of the conventional tape cassette for VTRs.
Figure 2:
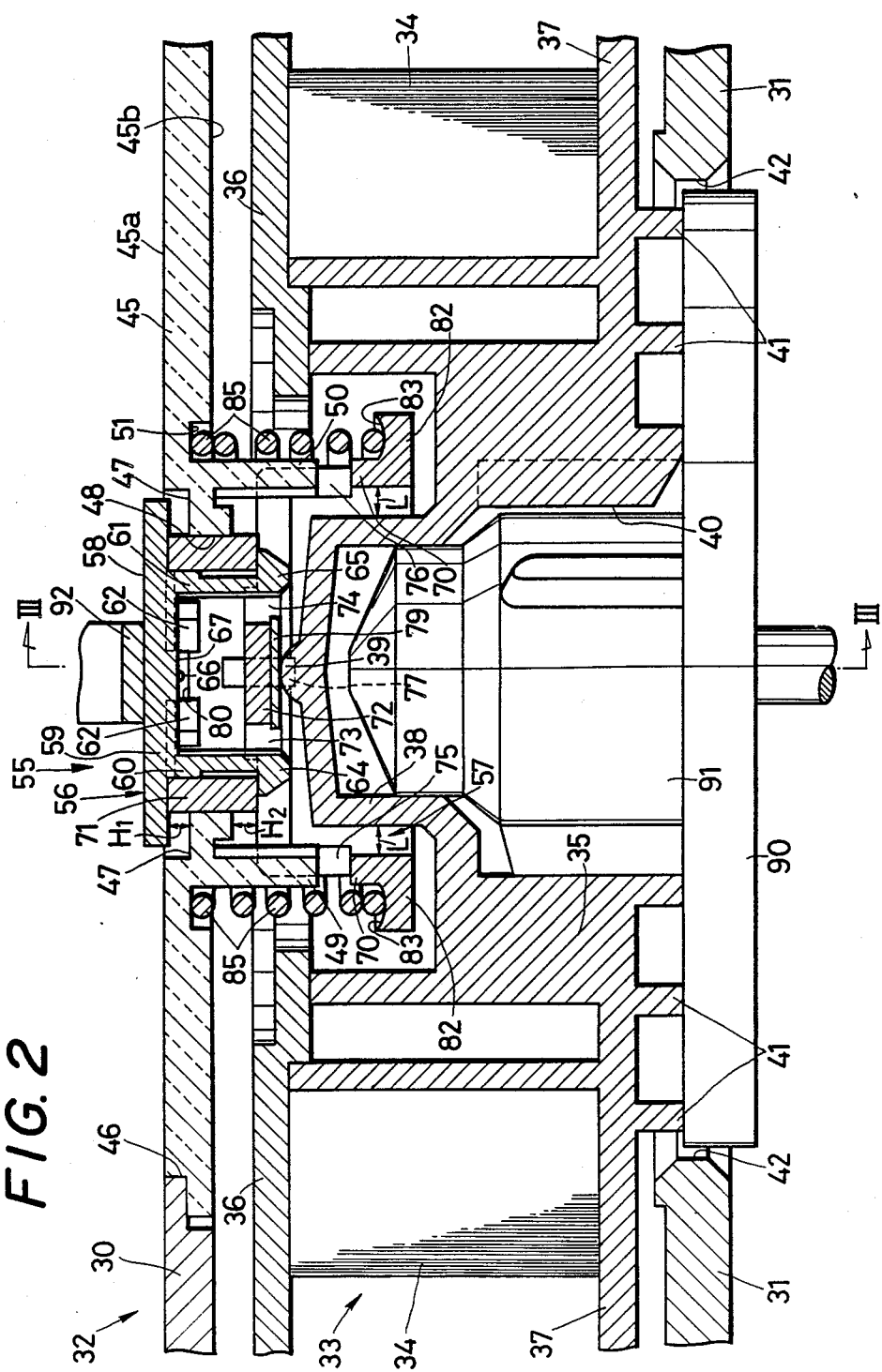
FIG. 2 is a sectional view of the essential part of a tape cassette according to an embodiment of this invention, for showing a reel depressed by a reel pressing means.
Figure 3:
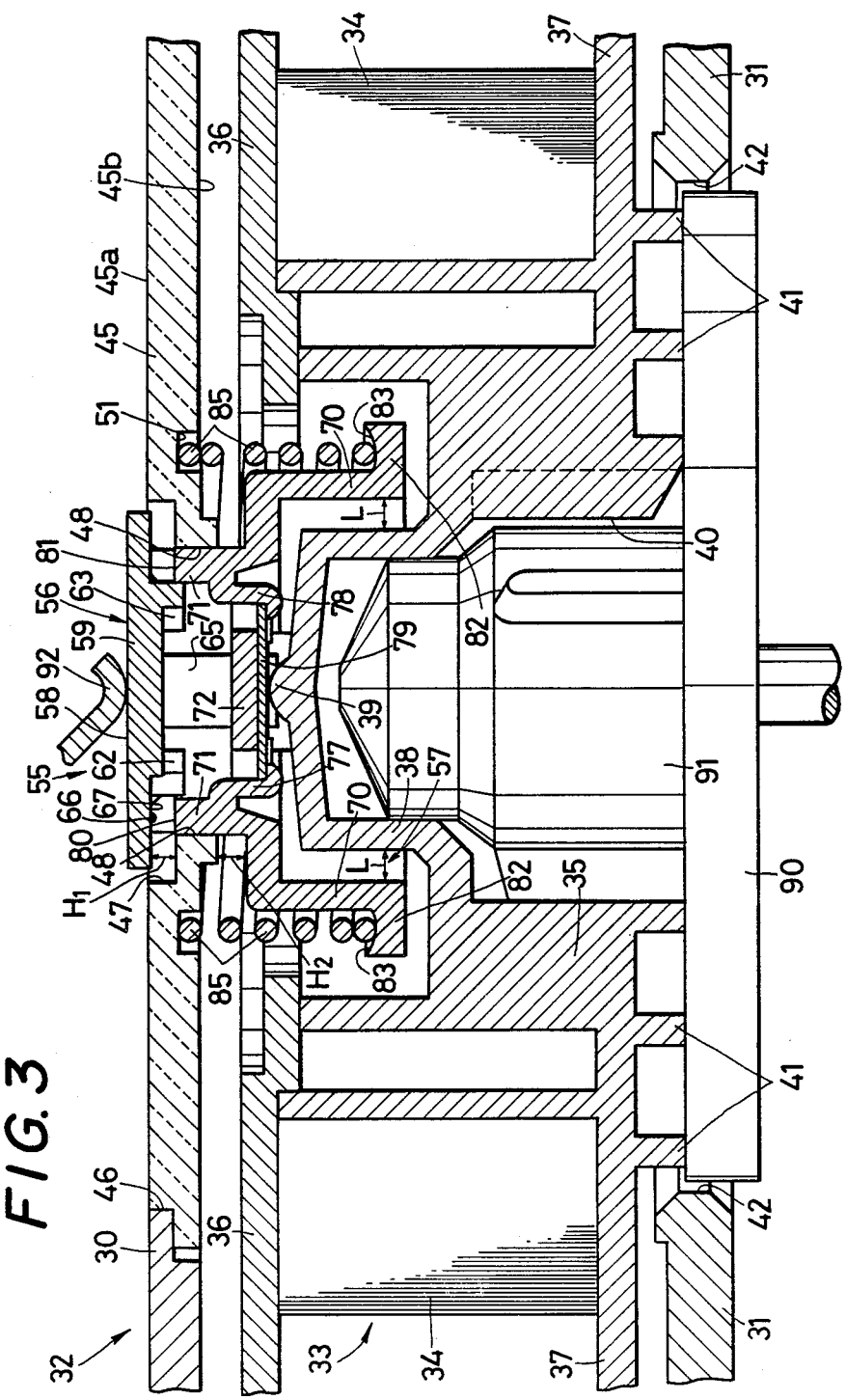
FIG. 3 is sectional view taken along the line III—III in FIG. 2.

As shown in FIGS. 2 and 3, a pair of right and left reels 33 (only one is shown) are rotatably arranged in a cassette casing 32 constituted of an upper half 30 and a lower half 31 which are molded from synthetic resin. Each reel 33 is also molded from synthetic resin (e.g., polyoxymethylene), and has a hub 35 around which a magnetic tape 34 is wound, and an upper flange 36 and a lower flange 37 provided at respective ends of the hub 35. The upper flange 36 is fixed to the outer upper end of the hub 35 by welding, and the lower flange 37 is molded integrally with the outer lower end of the hub 35. The hub 35 has a hollow cylinder shape which is closed by a wall 38 at the upper end thereof, and a semi-spherical projection 39 protrudes from an upper central portion of the wall 38, in other words, in alignment with the rotation axis of the hub 35. Moreover, a driving shaft engaging hole 40 is formed in the hollow cylinder so as to face downwardly, and annular ribs 41 integrally and concentrically formed with and projecting from the lower surface of the lower flange 37 are loosely fitted in a driving shaft insertion hole 42 provided in the lower half 31.

Planar transparent windows 45 molded from synthetic resin are fitted into the upper half 30 above the respective reels 33. The transparent window 45 is engaged from below with a window opening 46 formed in the upper half 30, and its periphery is fixed thereto by welding or adhesion. As shown in FIGS. 2 to 5, a circular recess 47 is provided in an end portion of the upper face 45a of the transparent window 45, and a through hole 48 is provided coaxially with the circular recess 47.

A pair of guide projections 49 and 50 protrude from the lower face 45b of the transparent window 45 on the periphery of, and in positions of, point symmetry with respect to the center of the through hole 48. Note that if the transparent window 45 is oblong, the guide projections 49 and 50 are provided so as to make the central line of the pair of guide projections 49 and 50 incline at an angle of 45 degrees with the axis of symmetry of the transparent window 45, lest the respective guide projections 45 and 50 of the windows 45 stacked adjacent to each other should interfere with each other. A spring seat 51 in the shape of an annular groove is formed in the lower face 45b of the transparent window 45 outside the guide portions 49 and 50.

Figure 4:
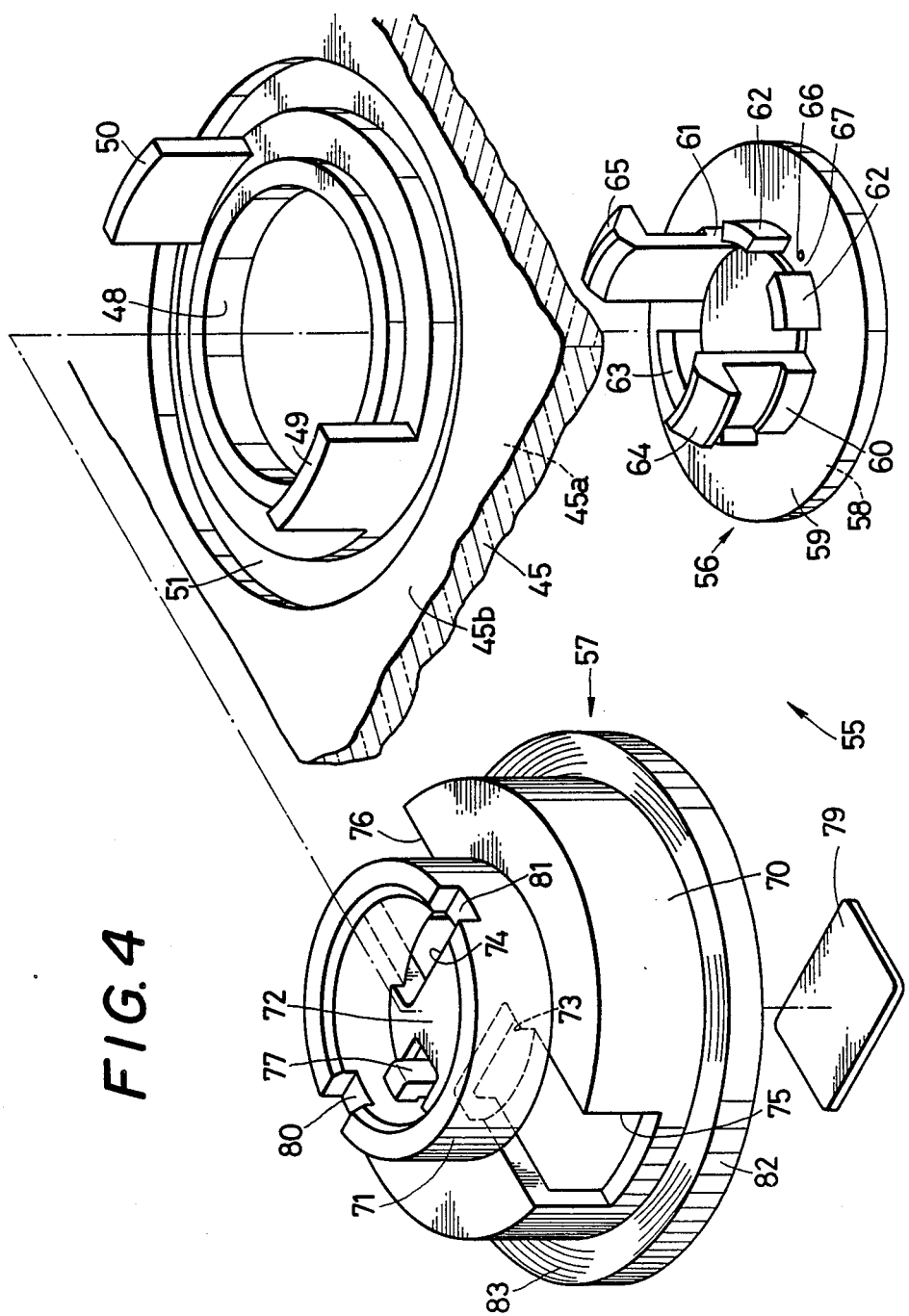
FIG. 4 is an exploded, perspective view of the reel pressing means of FIG. 2.

As shown in FIGS. 2 to 4, a reel pressing means 55 of the tape cassette comprises a cap 56 and a holder 57. The cap 56 is molded from synthetic resin (e.g., polyoxymethylene), and comprises a disk 59 having a flat continuous surface 58 at an upper end, and four arcuate ribs 60, 61, 62, and 63 projecting coaxially with the disk 59 from the lower surface of the disk 59. The pair of arcuate ribs 60 and 61 in opposed relation to each other extend downward, and have engaging portions 64 and 65 which can be elastically deformed in the radial direction. A gate 66 at the time when the cap 56 is injection molded, is located on the lower face of the disk 59 at the midpoint of the arcuated rib 62, so that a gap 67 is formed in the arcuated rib 62.

The holder 57 is molded from synthetic resin (e.g., polyoxymethylene), and comprises a large-diameter hollow cylinder portion 70 with a lower opening, a small-diameter hollow cylinder portion 71 with an upper opening, which is stacked coaxially with the large-diameter hollow cylinder portion 70, and an intermediate flat portion 72 for coupling the large- and small-diameter hollow cylinder portions 70 and 71.

As shown in FIG. 2, a pair of insertion holes 73 and 74 are provided in the intermediate flat portion 72 in positions of point symmetry with respect to the center of the opening and, so as to communicate with the respective insertion holes 73 and 74, a pair of engaging holes 75 and 76 are formed in the large-diameter hollow cylinder portion 70.

As shown in FIG. 3, a pair of elastic engaging-portions 77 and 78 project downward from the small-diameter hollow cylinder portion 71 and extend through the intermediate flat portion 72. The pair of elastic engaging-portions 77 and 78 are opposite one another and located 90° from the pair of insertion holes 73 and 74 respectively, and are elastically deformable in the radial direction.

Both ends of a reel bearing 79 of substantially rectangular shape are held by the elastic engaging-portions 77 and 78, and are brought into tight contact with the lower surface of the intermediate flat portion 72. The reel bearing 79 is made of wear resisting material, such as stainless steel, which is different from the material of which the projection 39 of the reel 33 is made.

A pair of notched portions 80 and 81 are formed on the top of the small-diameter hollow cylinder portion 71 above the elastic engaging portions 77 and 78. Moreover, a flange portion 82 is formed on the outer periphery of the lower end of the large-diameter hollow cylinder portion 70, and formed on the upper surface of the flange portion 82, is an annular spring seat 83 having a substantially arcuate cross-section.

Next, when the reel pressing means 55 is to be engaged with the upper half 30, the transparent window portion 45 is firstly fixed to the window opening 46 of the upper half 30, and the small-diameter hollow cylinder portion 71 of the holder 57 is inserted from below into the through hole 48 of the transparent window 45 as shown in FIG. 2. At that time, the guide projections 49 and 50 of the transparent window 45 are fitted into the engaging holes 75 and 76 of the large-diameter hollow cylinder portion 70 of the holder 57, so that rotation of the holder 57 with respect to the transparent window 45, that is, the upper half 30, is prevented. Upon insertion of the holder 57, a spring 85 of a compression coiled type is interposed between the spring seat 51 of the transparent window 45 and the spring seat 83 of the flange portion 82 of the large-diameter hollow cylinder portion 70 so as to surround the outer periphery of the holder 57.

The reel bearing 79 is assembled in advance in the holder 57. As shown in FIG. 3, one end of the reel bearing 79 is engaged with one of the engaging portions 77 against the force of the reel bearing 79, and then, the other end thereof is engaged against the force of the other engaging portion 78, so that the reel bearing 79 can be easily mounted on the holder 57, for example, without any help of adhesives or the like, and after mounting, is not easily disengaged from the engaging portions 77 and 78. In addition, as the two end portions of the reel bearing 79 are only engaged with the engaging portions 77 and 78, the large area of the reel bearing 79 can be effectively utilized, and further, the reel bearing 79 has a substantially rectangular shape, so that it does not rotate together with the reel 33.

Next, as shown in FIG. 2, the arcuated ribs 60, 61, 62, and 63 of the cap 56 are fitted from above into the small-diameter hollow cylinder portion 71 of the holder 57 to make the cap 56 mount on the upper end of the small-diameter hollow cylinder portion 71. At that time, the engaging portions 64 and 65 of the cap 56 are inserted into the respective insertion holes 73 and 74 of the intermediate flat portion 72 of the holder 57, and are engaged with the lower end of the small-diameter hollow cylinder portion 71. Thus, the cap 56 and the holder 57 are integrally coupled, so that the reel pressing means 55 comprising the cap 56 and holder 57 is mounted on the transparent window portion 45, that is, the upper half 30 so as to be vertically movable at a stroke of $H_1+H_2$. The diameters, the disk 59 of the cap 56 and the large-diameter hollow cylinder portion 70 of the holder 57 are larger than that of the through hole 48 of the transparent window portion 45, lest the cap 56 and holder 57 should separate from the upper half 30. The reel pressing means 55 comprising the cap 56 and holder 57 is vertically guided by the guide projections 49 and 50 of the upper half 30.

Note that as shown in FIG. 3, since the pair of notch portions 80 and 81 are formed on the upper end of the small-diameter hollow cylinder portion 71 of the holder 57, the gate 66 of the cap 56 faces either of the notched portions 80 and 81 when the cap 56 is engaged with the holder 57, so that the disk 59 of the cap 56 is always brought into tight contact with the upper end of the small-diameter hollow cylinder portion 71, and since the two notched portions 80 and 81 are symmetrically provided, it is not necessary to ascertain the sense of the cap 56 when the cap is mounted. Moreover, relative movement between the cap 56 and the holder 57 is prevented. The notched portions 80 and 81 may be of a V-shape or U-shape in place of such a shape as illustrated in the drawings.

Next, as shown in FIGS. 2 and 3, the upper half 30 on which the reel pressing means 55 is mounted, is engaged with the lower half 31 in which the reels 33 are accommodated, and thus, the cassette casing 32 is assembled. At that time, the large-diameter hollow cylinder portion 70 of the holder 57 is fitted to the hollow cylinder portion 38 of the reel 33, and the reel bearing 79 of the holder 57 abuts against the projection 39 of the reel 33.

According to the tape cassette mentioned above, when the tape cassette is out of use, the reel pressing means 55 is urged downwards at a stroke of $H_1$ due to the compressive force of the spring 85 (which is comparatively small when the tape cassette is out of use), and the projection 39 of the reel 33 is pressed against the reel bearing 79 of the holder 57, so that the reel 33 is pressed against the lower half 31. At that time, the disk 59 of the cap 56 is accommodated in the circular recess 47 of the transparent window 45, and only the continuous surface 58 of the cap 56 is exposed, so that the appearance of the tape cassette is much improved. Note that the cylindrical wall 38 of the reel 33 is fitted to the large-diameter hollow cylinder portion 70 of the holder 57, so that even if the reel 33 is moved in a right to left direction under a state that the reel 33 is heavily and unexpectedly pressed from below and is separated from the lower half 31, the wall 38 of the reel 33 abuts against the large-diameter hollow cylinder portion 70 of the holder 57 after it is moved by about a distance L, and thus, the movement of the reel 33 is prohibited. Therefore, the reel 33 is prevented from riding on the lower half 31.

When a tape cassette inserted in the cassette mounting device (not shown) of the video tape recorder, is conveyed to a cassette mounting position, a reel base 90 is relatively inserted from below into the driving shaft insertion hole 42 of the lower half, and a driving shaft 91 projecting from the upper central portion of the reel base 90 is fitted into the driving-shaft engaging hole 40 of the reel 33. In addition, the annular ribs 41 are placed on the reel base 90. Thus, the lower flange 37 of the reel 33 is separated from the lower half 31. At that time, a reel pressing member 92 of a leaf spring type provided in the cassette mounting device is pressed against the continuous surface 58 of the disk 59 of the cap 56, and the reel 33 is heavily pressed downwards by the forces of the reel pressing member 92 and spring 85, so that the reel 33 is stably fixed to the reel base 90.

It will be seen that the reel pressing means 55 comprises the cap 56 and the holder 57, the cap 56 is engaged from above with the transparent window 45, that is, the upper half 30, and the upper end of the disk 59 of the cap 56 has the continuous surface 58, so that the reel pressing member 92 is not caught by the continuous surface 58, but the cap 56 of the reel pressing means 55 can be very stably pressed by the reel press member 92. As a result, the reel 33 is always stably fixed on the reel base 90, and is prevented from the gyration of its rotation axis and its relative movement to the reel base 90 during rotation of the reel 33. Therefore, rotation of the reel 33 and the travel of the magnetic tape 34 are stabilized.

Furthermore, as the reel pressing member 92 is never caught by the continuous surface 58 of the cap 56, the reel pressing member 92 is not restricted in its configuration and construction, and can be freely designed, so that the tape cassette of this invention can be used for various types of VTRs Moreover, since the reel bearing 79 of the holder 57 is made of wear resisting material different from the material used for the projection 39 of the reel 33, the reel 33 is smoothly related.

Figure 5:
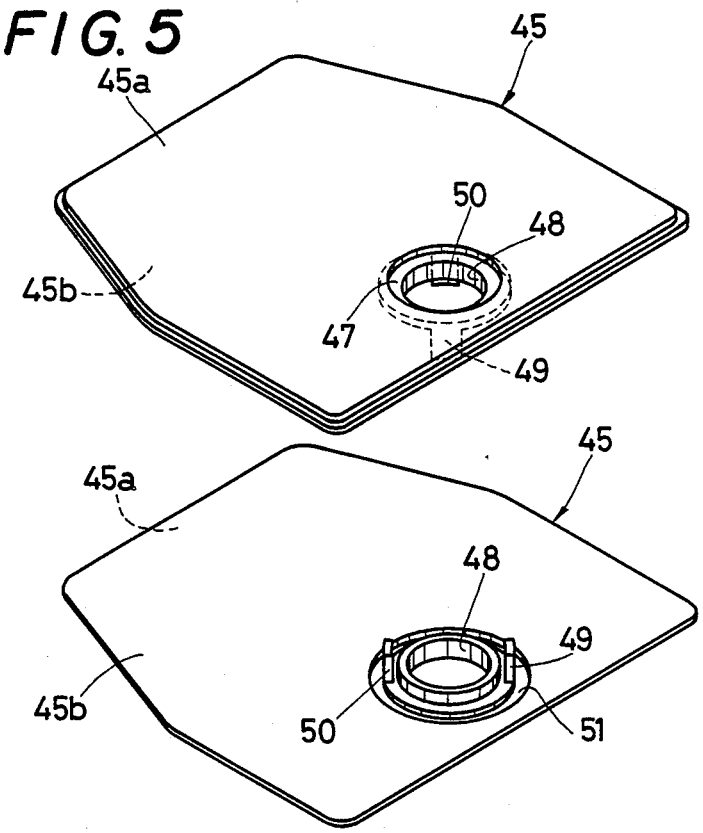
FIG. 5 is an perspective view of two transparent windows which are about to be stacked upon each other.
Figure 6:
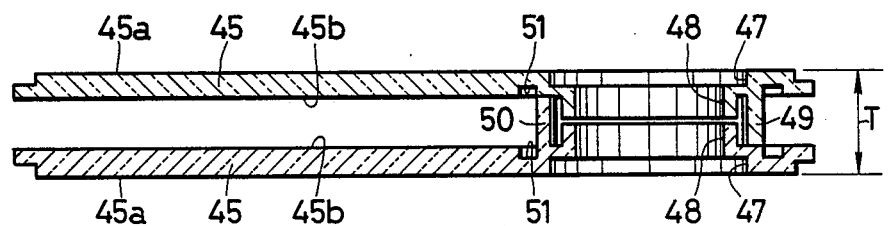
FIG. 6 is a sectional view of the two transparent windows of FIG. 5, in which the windows have been piled each other.

In the embodiment illustrated, the pair of guide projections 49 and 50 of the transparent window 45 are fitted into the pair of engaging holes 75 and 76 of the holder 57 so as to make the reel pressing means 55 guide without rotation thereof. Such guide projections 49 and 50 as mentioned above, are provided in positions of point symmetry with respect to the center of the through hole 48, and as shown in FIG. 5, the central line of the pair of guide projections 49 and 50 inclines 45 degrees with respect to the axis of symmetry of the transparent window 45 through the through hole 48, so that when a pair of transparent windows 45 are stacked as shown in FIG. 6, under a state that the lower faces 45 of the pair of transparent window 45 are in opposed relation to each other, the respective guide projections of the pair of windows 45 do not interfere with each other. Therefore, when the transparent window portions 45 are packed after their molding, the thickness T of the two transparent window portions 45 can be minimized, and it is very convenient when a large number of transparent window portions 45 are transported.

The present invention has been described with reference to an embodiment. The present invention is not limited to the above embodiment, and various effective modifications may be made within the spirit and scope of the invention.

For example, in the above embodiment, the cap has a flat continuous surface, but may have a curved continuous surface such as a spherical projecting surface or a spherical recessed surface. In the above embodiment, the cap is engaged with the holder using a pair of engaging portions. However, various engaging mechanism may be adopted instead. In the above embodiment, a through hole is formed in the transparent window of the upper half. However, the through hole may be formed in the upper half.

The present invention is not limited to a tape cassette for a video tape recorder, but may be applied to a tape cassette for various other recording and/or reproduction apparatuses.

What is claimed is:
1. A tape cassette comprising:
a reel on which a tape is wound;

a cassette casing having an upper half with a hole and a lower half, said upper half and said lower half being formed so as to rotatably accommodate said reel therebetween; and a reel pressing means fitted into said hole in said upper half, said reel pressing means having:

(a) a holder including a reel bearing for bearing said reel by way of a projection provided in alignment with the axis of rotation of said reel;

(b) a cap formed with an upper surface that is continuous and pressable by a reel pressing member provided in a cassette mounting device, said cap being engageable with said holder so that said cap and said holder are disposed on opposite sides of said upper half; and (c) spring means interposed between upper half and said holder so as to urge said reel toward said lower half;

said continuous surface being flat so as to facilitate engagement with said pressing member over an extended area and so as to impose substantially no restriction on the configuration and construction of said real pressing member.

2. A tape cassette according to claim 1, wherein said reel-bearing of the holder is made of an abrasion resistant material different from that used for said projection of the reel.

3. A tape cassette comprising:

a reel on which a tape is wound;

a cassette casing having an upper half with a hole and a lower half, said upper half and said lower half being formed so as to rotatably accommodate said reel therebetween; and a reel pressing means fitted into said hole in said upper half, said reel pressing means having:

(a) a holder including a reel bearing for bearing said reel by way of a projection provided in alignment with the axis of rotation of said reel;

(b) a cap including a continuous surface whihc is pressable by a reel pressing member provided in a cassette mounting device, said cap being engageable with said holder so that said cap and said holder are disposed on opposite sides of said upper half; and (c) spring means interposed between said upper half and said holder so as to urge said reel toward said lower half;

wherein said cap and said holder, except portions thereof fitted into said hole of the upper half, have a larger diameter than said hole so that said cap and said holder are not separable from said upper half after said cap and said holder are engaged with each other.

4. A tape cassette according to claim 3, wherein said cap and said holder have elastically deformable engaging portions provided so as to engage said cap and holder together.

5. A tape cassette according to claim 3, wherein a guide portion is provided on the periphery of said hole of the upper half so as to guide said reel pressing means in an up and down direction.

6. A tape cassette according to claim 3 wherein said spring means includes a coiled spring provided so as to surround said holder, said holder having a lower end at which a flange with a first spring seat is provided, said upper half of said cassette casing having a lower face provided with a second spring seat, each end of said coiled spring being received by one of said spring seats.

7. A tape cassette comprising:

a reel on which a tape is wound;

a cassette casing having an upper half provided with a transparent window portion in which a hole is formed and a lower half formed with a driving-shaft insertion hole, and rotatably accommodating said reel therein; and reel pressing means fitted into said hole in said transparent window portion of the upper half, said reel pressing means having:

(a) a holder including a reel bearing for bearing said reel by way of a projection which is provided in said reel in alignment with the axis of rotation thereof;

(b) a cap formed with an upper surface that is continuous and pressable by a reel pressing member provided in a cassette mounting device, said cap being engageable with said holder so that said cap and said holder are disposed on opposite sides of said upper half; and (c) spring means interposed between said upper half and said holder so as to urge said reel toward said lower half;

said continuous surface being flat so as to facilitate engagement with said pressing member over an extended area and so as to impose substantially no restriction on the configuration and construction of said reel pressing member.

* * * * *

UNITED STATES PATENT AND TRADEMARK OFFICE
CERTIFICATE OF CORRECTION

PATENT NO. : 4,896,238
DATED : January 23, 1990
INVENTOR(S) : Takashi Oogi, Tadao Igarashi It is certified that error appears in the above-identified patent and that said Letters Patent is hereby corrected as shown below:

Col. 2, line 53, change "piled" to --stacked upon--

Col. 3, line 63, after "opening" insert --,--

Col. 6, line 22, after "VTRs" insert --.--

IN THE CLAIMS

Col. 7, line 39, change "whihc" to --which--

Col. 8, line 13, after "claim 3" insert --,--

Signed and Sealed this

Second Day of April, 1991

Attest:

HARRY F. MANBECK, JR.

Attesting Officer

Commissioner of Patents and Trademarks